(12) United States Patent
Shulkin et al.

(10) Patent No.: US 10,708,227 B2
(45) Date of Patent: Jul. 7, 2020

(54) SCALABLE SECURE GATEWAY FOR VEHICLE

(71) Applicant: MAGNA ELECTRONICS INC., Auburn Hills, MI (US)

(72) Inventors: Boris Shulkin, West Bloomfield, MI (US); Kelei Shen, Bloomfield Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 132 days.

(21) Appl. No.: 15/652,878

(22) Filed: Jul. 18, 2017

(65) Prior Publication Data

US 2018/0026945 A1   Jan. 25, 2018

Related U.S. Application Data

(60) Provisional application No. 62/364,027, filed on Jul. 19, 2016.

(51) Int. Cl.
| | | |
|---|---|---|
| *H04L 29/06* | (2006.01) | |
| *H04W 88/16* | (2009.01) | |
| *H04W 4/44* | (2018.01) | |
| *H04W 12/06* | (2009.01) | |
| *H04W 84/18* | (2009.01) | |
| *H04W 84/12* | (2009.01) | |
| *B60R 16/023* | (2006.01) | |
| *H04W 4/80* | (2018.01) | |

(52) U.S. Cl.
CPC .......... *H04L 63/0263* (2013.01); *H04W 4/44* (2018.02); *H04W 12/06* (2013.01); *H04W 88/16* (2013.01); *B60R 16/023* (2013.01); *H04W 4/80* (2018.02); *H04W 84/12* (2013.01); *H04W 84/18* (2013.01)

(58) Field of Classification Search
CPC .... H04L 63/0263; H04W 4/44; H04W 12/06; H04W 88/16; H04W 4/80; H04W 84/18; H04W 84/12; B60R 16/023
See application file for complete search history.

(56) References Cited

U.S. PATENT DOCUMENTS

| | | |
|---|---|---|
| 4,862,594 A | 9/1989 | Schierbeek et al. |
| 4,937,945 A | 7/1990 | Schofield et al. |
| 5,131,154 A | 7/1992 | Schierbeek et al. |
| 5,255,442 A | 10/1993 | Schierbeek et al. |
| 5,550,677 A | 8/1996 | Schofield et al. |
| 5,632,092 A | 5/1997 | Blank et al. |
| 5,670,935 A | 9/1997 | Schofield et al. |
| 5,752,065 A | 5/1998 | Staiger |
| 5,796,094 A | 8/1998 | Schofield et al. |
| 5,877,897 A | 3/1999 | Schofield et al. |
| 5,924,212 A | 7/1999 | Domanski |
| 6,292,718 B2 | 9/2001 | Staiger |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |

(Continued)

*Primary Examiner* — Chau Le
*Assistant Examiner* — Hany S. Gadalla
(74) *Attorney, Agent, or Firm* — Honigman LLP

(57) ABSTRACT

A vehicular scalable secure gateway system for a vehicle includes a connected gateway and a secure gateway. The vehicular scalable secure gateway system provides flexibility to add and/or remove one or more particular security measures based on the need for the particular security measure or measures.

14 Claims, 2 Drawing Sheets

(56) References Cited

U.S. PATENT DOCUMENTS

| | | |
|---|---|---|
| 6,477,464 B2 | 11/2002 | McCarthy et al. |
| 6,498,620 B2 | 12/2002 | Schofield et al. |
| 6,571,136 B1 | 5/2003 | Staiger |
| 6,587,186 B2 | 7/2003 | Bamji et al. |
| 6,628,441 B1 | 9/2003 | Staiger |
| 6,629,033 B2* | 9/2003 | Preston .................. G05B 15/02 307/9.1 |
| 6,654,910 B1 | 11/2003 | Eibach et al. |
| 6,674,895 B2 | 1/2004 | Rafii et al. |
| 6,678,039 B2 | 1/2004 | Charbon |
| 6,678,614 B2 | 1/2004 | McCarthy et al. |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,778,073 B2 | 8/2004 | Lutter et al. |
| 6,806,452 B2 | 10/2004 | Bos et al. |
| 6,824,281 B2 | 11/2004 | Schofield et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 6,946,978 B2 | 9/2005 | Schofield |
| 6,950,312 B2 | 9/2005 | Staiger |
| 6,952,782 B2 | 10/2005 | Staiger |
| 7,004,593 B2 | 2/2006 | Weller et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,053,357 B2 | 5/2006 | Schwarte |
| 7,123,168 B2 | 10/2006 | Schofield |
| 7,140,026 B2 | 11/2006 | Staiger |
| 7,146,260 B2 | 12/2006 | Preston et al. |
| 7,157,685 B2 | 1/2007 | Bamji et al. |
| 7,167,796 B2 | 1/2007 | Taylor et al. |
| 7,176,438 B2 | 2/2007 | Bamji et al. |
| 7,178,049 B2 | 2/2007 | Lutter |
| 7,203,356 B2 | 4/2007 | Gokturk et al. |
| 7,205,904 B2 | 4/2007 | Schofield |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,349,844 B2 | 3/2008 | Staiger |
| 7,352,454 B2 | 4/2008 | Bamji et al. |
| 7,355,524 B2 | 4/2008 | Schofield |
| 7,358,849 B1* | 4/2008 | Pesina .................. B60R 25/245 340/426.17 |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,412,328 B2 | 8/2008 | Uhlmann et al. |
| 7,474,963 B2 | 1/2009 | Taylor et al. |
| 7,580,795 B2 | 8/2009 | McCarthy et al. |
| 7,647,180 B2* | 1/2010 | Breed .................... G08G 1/161 340/436 |
| 7,697,027 B2 | 4/2010 | McMahon et al. |
| 7,720,580 B2 | 5/2010 | Higgins-Luthman |
| 7,777,611 B2 | 8/2010 | Desai |
| 7,855,755 B2 | 12/2010 | Weller et al. |
| 8,013,780 B2 | 9/2011 | Lynam |
| 8,027,029 B2 | 9/2011 | Lu et al. |
| 8,086,771 B2* | 12/2011 | Staiger ................. G05B 19/042 700/19 |
| 8,625,778 B2 | 1/2014 | Jung et al. |
| 9,036,026 B2 | 5/2015 | Dellantoni et al. |
| 9,096,189 B2* | 8/2015 | Golden ................. B60R 25/018 |
| 9,146,898 B2 | 9/2015 | Ihlenburg et al. |
| 9,173,100 B2* | 10/2015 | Ricci ...................... G06F 3/0484 |
| 9,575,160 B1 | 2/2017 | Davis et al. |
| 9,599,702 B1 | 3/2017 | Bordes et al. |
| 2005/0046553 A1* | 3/2005 | Flick .................. B60R 25/1003 340/426.1 |
| 2005/0130723 A1* | 6/2005 | Grivas ................. B60R 25/104 455/575.9 |
| 2005/0154475 A1 | 7/2005 | Forchert et al. |
| 2007/0118280 A1 | 5/2007 | Uhlmann et al. |
| 2008/0007618 A1 | 1/2008 | Yuasa |
| 2008/0046150 A1 | 2/2008 | Breed |
| 2008/0106389 A1 | 5/2008 | Desai |
| 2008/0174453 A1 | 7/2008 | Schofield |
| 2008/0192984 A1 | 8/2008 | Higuchi et al. |
| 2012/0047551 A1* | 2/2012 | Pattar ...................... H04W 4/00 726/1 |
| 2012/0062743 A1 | 3/2012 | Lynam et al. |
| 2012/0079149 A1* | 3/2012 | Gelvin .................. G06F 15/173 710/107 |
| 2012/0218412 A1 | 8/2012 | Dellantoni et al. |
| 2013/0222592 A1 | 8/2013 | Gieseke |
| 2014/0218529 A1 | 8/2014 | Mahmoud et al. |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2016/0255154 A1* | 9/2016 | Kim ........................ G09C 1/00 726/25 |
| 2017/0310674 A1* | 10/2017 | Markham ........... B60R 16/0231 |
| 2018/0144128 A1* | 5/2018 | Hakuta .................. G06F 21/55 |

* cited by examiner

Basic Security Measures
- OBDII Isolation
- CAN Protection

Additional IP Based Network Security Measures
- OBDII Isolation
- CAN Protection
- Ethernet

Security for USB Access Port
- OBDII Isolation
- CAN Protection
- Ethernet
- USB

Security for Near Field Wireless Access Points
- OBDII Isolation
- CAN Protection
- Ethernet
- USB
- BT
- Wi-Fi

Security for Long Range Wireless Communication
- OBDII Isolation
- CAN Protection
- Ethernet
- USB
- BT
- Wi-Fi
- 3G/4G/LTE
- GPS/GNSS

FIG. 2

SCALABLE SECURE GATEWAY FOR VEHICLE

CROSS REFERENCE TO RELATED APPLICATION

The present application claims the filing benefits of U.S. provisional application Ser. No. 62/364,027, filed Jul. 19, 2016, which is hereby incorporated herein by reference in its entirety.

FIELD OF THE INVENTION

The present invention relates to processing systems for vehicles and, more particularly, to processing systems that process inputs from various sensors and control various vehicular systems and accessories in response to such inputs.

BACKGROUND TO THE INVENTION

It is known to provide a data/computing processor (such as an electronic control unit or ECU) that receives multiple inputs from and/or provides multiple outputs to multiple sensors, controls and/or accessories in an automotive vehicle. Examples of such processing systems are described in U.S. Pat. Nos. 6,629,033; 6,778,073; 7,146,260 and/or 7,178,049, which are hereby incorporated herein by reference in their entireties. It is also known to provide a vehicle system that receives multiple inputs and may provide or generate different outputs in response to processing of the inputs, such as the systems described in U.S. Pat. Nos. 7,697,027; 7,355,524 and/or 7,205,904, which are hereby incorporated herein by reference in their entireties.

SUMMARY OF THE INVENTION

The present invention provides a vehicular scalable secure gateway or system that provides flexibility to add and/or remove any particular security measure based on the need for any particular security measure.

These and other objects, advantages, purposes and features of the present invention will become apparent upon review of the following specification in conjunction with the drawings.

BRIEF DESCRIPTION OF THE DRAWINGS

FIG. 2 is a schematic of different levels of the scalable secure gateway in accordance with the present invention.

DESCRIPTION OF THE PREFERRED EMBODIMENTS

Figure 1:
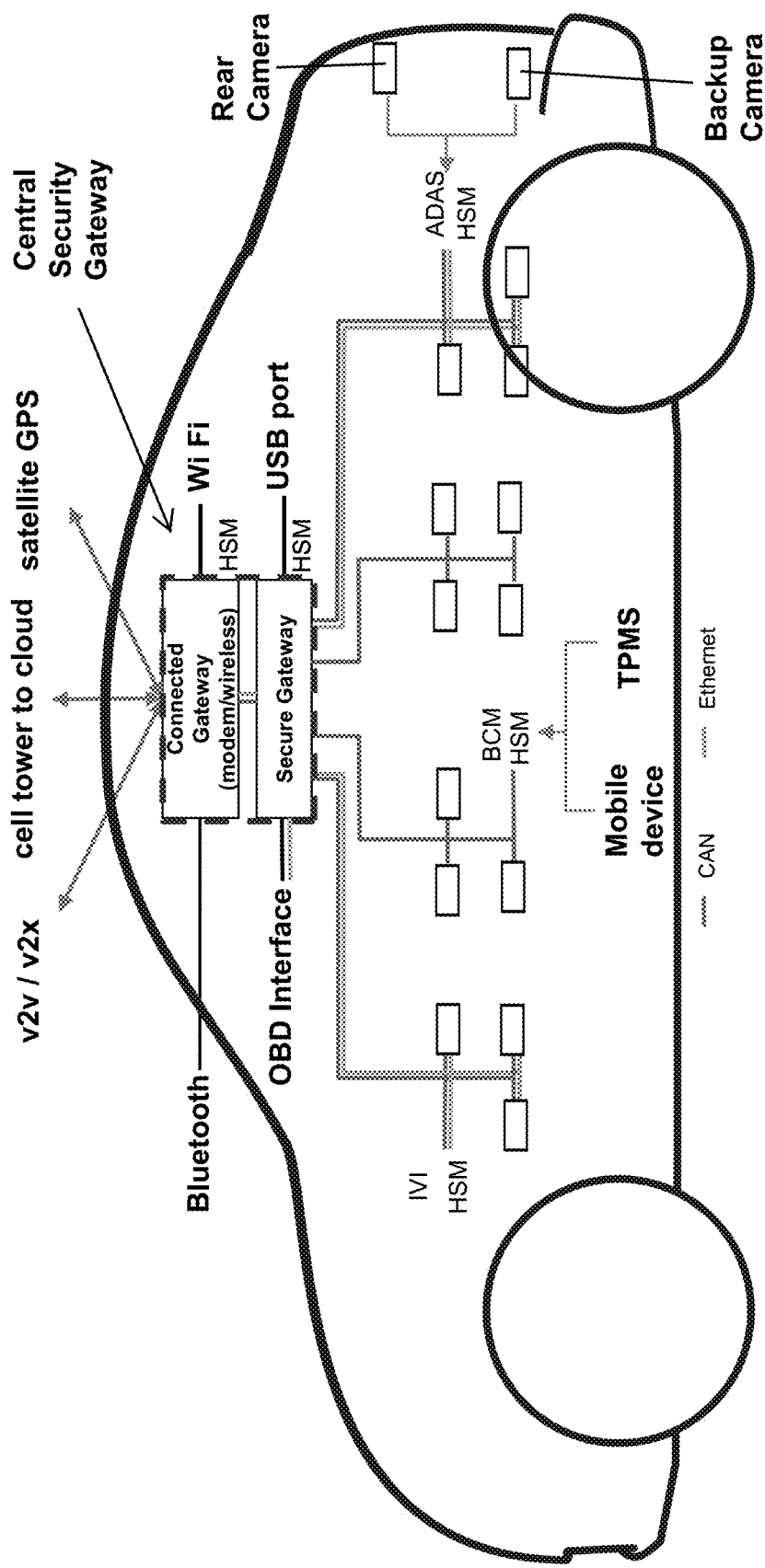
FIG. 1 is a schematic of a vehicular security system in accordance with the present invention.

The present invention provides a vehicular scalable security system and secure gateway that is responsive to inputs from multiple accessories and/or systems or subsystems and is operable to select the appropriate measures of security depending on the particular need at any given time or situation. As shown in FIG. 1, a comprehensive vehicle security system or approach includes a connected gateway and a secure gateway for receiving and communicating data pertaining to multiple sensors of the vehicle.

For perimeter security, the system routes all access points through a centralized gateway and ECU with a trust anchor. The system authenticates access to the vehicle, such as via remote commands, diagnostics, over the air (OTA) communications, data privacy, and/or the like. The system uses network segmentation to limit traffic between vehicle network systems. The network security provides centralized intrusion detection and pretension systems with message authentication for in-vehicle networks. The system monitors, analyzes and mitigates risks via connected, centralized off-board services.

The system of the present invention determines a level of security measures that are needed for a particular situation and may utilize the appropriate measures. As shown in FIG. 2, different security measures may be selected and provided based on the particular situation or particular need. The system provides flexibility to add and/or remove any particular security measure based on the particular situation or need. For example, for basic security measures, the system may use OBDII (onboard diagnostics) isolation and CAN protection, but may also add Ethernet security measures for additional IP based networks security measures, while USB security measures may also be added when it is desired to provide security for USB access ports. Bluetooth® and Wi-Fi security measures may also be added when security is needed for near field wireless access points, and 3G/4G/LTE and/or global positioning system (GPS)/global navigation satellite system (GNSS) security measures may be added for security for long range wireless communication. Different combinations of the different security measures may be added/removed based on the particular situation/application of the system. As shown in FIG. 2, the system may operate in connection with an in-vehicle infotainment (IVI) module (such as a Hardware Security Module or HSM), an advanced driver assistance system (ADAS), which may be connected to a rear camera and/or a backup camera, and/or a body control module (BCM), which may be in communication with a mobile device or a tire pressure monitoring system (TPMS) of the vehicle.

The system may utilize aspects of the scalable system described in U.S. Pat. No. 9,036,026, which is hereby incorporated herein by reference in its entirety.

The system may include inputs from one or more cameras of the vehicle (such as cameras for a driver assistance system or the like). The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Publication Nos. US 2010-0020170 and/or US-2009-0244361, which are all hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar or lidar sensors or the like. The sensing system may utilize aspects of the systems described in U.S. Pat. Nos. 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication No. US-2010-0245066 and/or U.S. patent application Ser. No. 15/647,339, filed Jul. 12, 2017, Ser. No. 15/619,627, filed Jun. 12, 2017, Ser. No. 15/584,265, filed May 2, 2017, Ser. No. 15/467,247, filed Mar. 23, 2017, Ser. No. 15/446,220, filed Mar. 1, 2017, and/or Ser. No. 15/420,238, filed Jan. 31, 2017, and/or International PCT Application No. PCT/IB2017/054120, filed Jul. 7, 2017, and/or U.S. provisional application Ser. No. 62/375,161, filed Aug. 15, 2016, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular scalable secure gateway system for a vehicle, said vehicular scalable secure gateway system comprising:
a central security gateway disposed at a vehicle equipped with said vehicular scalable secure gateway system;
wherein said vehicular scalable secure gateway system comprises a connected gateway and a secure gateway;
wherein said connected gateway receives wireless communications emanating from external of the vehicle, wherein the wireless communications comprise at least one selected from the group consisting of (i) vehicle-to-vehicle (v2v) communications, (ii) vehicle-to-infrastructure (v2x) communications, (iii) cell tower communications, (iv) BLUETOOTH communications and (iv) Wi-Fi communications;
wherein wireless communications received at said connected gateway are routed through said secure gateway for communication, via a data communication network of the vehicle, to a system of the vehicle; and
wherein said vehicular scalable secure gateway system is operable to enable a particular security measure based on determination of a need for that particular security measure;
wherein the particular security measure is selected from the group consisting of (i) basic security measures, (ii) network security measures, (iii) access port security measures, (iv) access point security measures, and (v) wireless communication security measures;
wherein the basic security measures, when selected, provides enhanced isolation of an on-board diagnostic interface at said secure gateway and enhanced protection of the data communication network of the vehicle;
wherein the network security measures, when selected, provides the basic security measures and enhanced protection at the vehicle of communications via Ethernet links;
wherein the access port security measures, when selected, provides the network security measures and enhanced protection of a USB access port of the vehicle;
wherein the access point security measures, when selected, provides the access port security measures and enhanced protection of one or both of (i) a BLUETOOTH system of the vehicle and (ii) a WiFi system of the vehicle; and
wherein the wireless communication security measures, when selected, provides the access point security measures and enhanced security at the vehicle for 3G/4G/LTE communications.

2. The vehicular scalable secure gateway system of claim 1, wherein said connected gateway is in wireless communication with a satellite global positioning system.

3. The vehicular scalable secure gateway system of claim 1, wherein said connected gateway is in communication with a wireless communication system of the vehicle.

4. The vehicular scalable secure gateway system of claim 1, wherein said secure gateway is in communication with an on-board diagnostic interface of the vehicle.

5. The vehicular scalable secure gateway system of claim 1, wherein said secure gateway is in communication with a USB port of the vehicle.

6. The vehicular scalable secure gateway system of claim 1, wherein said secure gateway is in communication with a body control module (BCM) of the vehicle via the data communication network of the vehicle.

7. The vehicular scalable secure gateway system of claim 1, wherein said secure gateway is in communication with a driving assist system (DAS) of the vehicle via the data communication network of the vehicle.

8. The vehicular scalable secure gateway system of claim 1, wherein said secure gateway is in communication with a driving assist system (DAS) of the vehicle via the data communication network of the vehicle, and wherein the data communication network of the vehicle comprises an Ethernet link.

9. A vehicular scalable secure gateway system for a vehicle, said vehicular scalable secure gateway system comprising:
a central security gateway;
wherein said central security gateway comprises a connected gateway and a secure gateway;
wherein said connected gateway receives wireless communications emanating from external of the vehicle, wherein the wireless communications comprise at least one selected from the group consisting of (i) vehicle-to-vehicle (v2v) communications, (ii) vehicle-to-infrastructure (v2x) communications, (iii) cell tower communications, (iv) BLUETOOTH communications and (iv) Wi-Fi communications;
wherein wireless communications received at said connected gateway are routed through said secure gateway for communication, via a data communication network of the vehicle, to a system of the vehicle;
wherein said vehicular scalable secure gateway system is operable to enable a particular security measure based on determination of a need for that particular security measure;
wherein said secure gateway is in communication with an on-board diagnostic interface of the vehicle;
wherein the particular security measure is selected from the group consisting of (i) basic security measures, (ii) network security measures, (iii) access port security measures, and (iv) access point security measures;
wherein the basic security measures, when selected, provides enhanced isolation of an on-board diagnostic interface at said secure gateway and enhanced protection of the data communication network of the vehicle;
wherein the network security measures, when selected, provides the basic security measures and enhanced protection at the vehicle of communications via Ethernet links;
wherein the access port security measures, when selected, provides the network security measures and enhanced protection of a USB access port of the vehicle;
wherein the access point security measures, when selected, provides the access port security measures and enhanced protection of one or both of (i) a BLUETOOTH system of the vehicle and (ii) a WiFi system of the vehicle; and
wherein said connected gateway is in wireless communication with a satellite global positioning system and a wireless communication system of the vehicle.

10. The vehicular scalable secure gateway system of claim 9, wherein said secure gateway is in communication with a body control module (BCM) of the vehicle via the data communication network of the vehicle.

11. The vehicular scalable secure gateway system of claim 9, wherein said secure gateway is in communication with a driving assist system (DAS) of the vehicle via the data communication network of the vehicle.

12. The vehicular scalable secure gateway system of claim 9, wherein said secure gateway is in communication with a driving assist system (DAS) of the vehicle via the data communication network of the vehicle, and wherein the data communication network of the vehicle comprises an Ethernet link.

13. A vehicular scalable secure gateway system for a vehicle, said vehicular scalable secure gateway system comprising:

a central security gateway;

wherein said central security gateway comprises a connected gateway and a secure gateway;

wherein said connected gateway receives wireless communications emanating from external of the vehicle, wherein the wireless communications comprise at least one selected from the group consisting of (i) vehicle-to-vehicle (v2v) communications, (ii) vehicle-to-infrastructure (v2x) communications, (iii) cell tower communications, (iv) BLUETOOTH communications and (iv) Wi-Fi communications;

wherein wireless communications received at said connected gateway are routed through said secure gateway for communication, via a data communication network of the vehicle, to a system of the vehicle;

wherein said secure gateway is in communication with an on-board diagnostic interface of the vehicle, a communication network of the vehicle, a USB access port of the vehicle, a BLUETOOTH system of the vehicle and a WiFi system of the vehicle;

wherein said vehicular scalable secure gateway system is operable to enable a particular security measure based on determination of a need for that particular security measure;

wherein the particular security measure is selected from the group consisting of (i) basic security measures, (ii) network security measures, (iii) access port security measures, and (iv) wireless communication security measures;

wherein the basic security measures, when selected, provides enhanced isolation of an on-board diagnostic interface at said secure gateway and enhanced protection of the data communication network of the vehicle;

wherein the network security measures, when selected, provides the basic security measures and enhanced protection at the vehicle of communications via Ethernet links;

wherein the access port security measures, when selected, provides the network security measures and enhanced protection of a USB access port of the vehicle; and wherein the wireless communication security measures, when selected, provides the access port security measures and enhanced security at the vehicle for 3G/4G/LTE communications.

14. The vehicular scalable secure gateway system of claim 13, wherein said connected gateway is in wireless communication with (i) a satellite global positioning system, (ii) a body control module (BCM) of the vehicle and (iii) a driving assist system (DAS) of the vehicle.

* * * * *